UNITED STATES PATENT OFFICE.

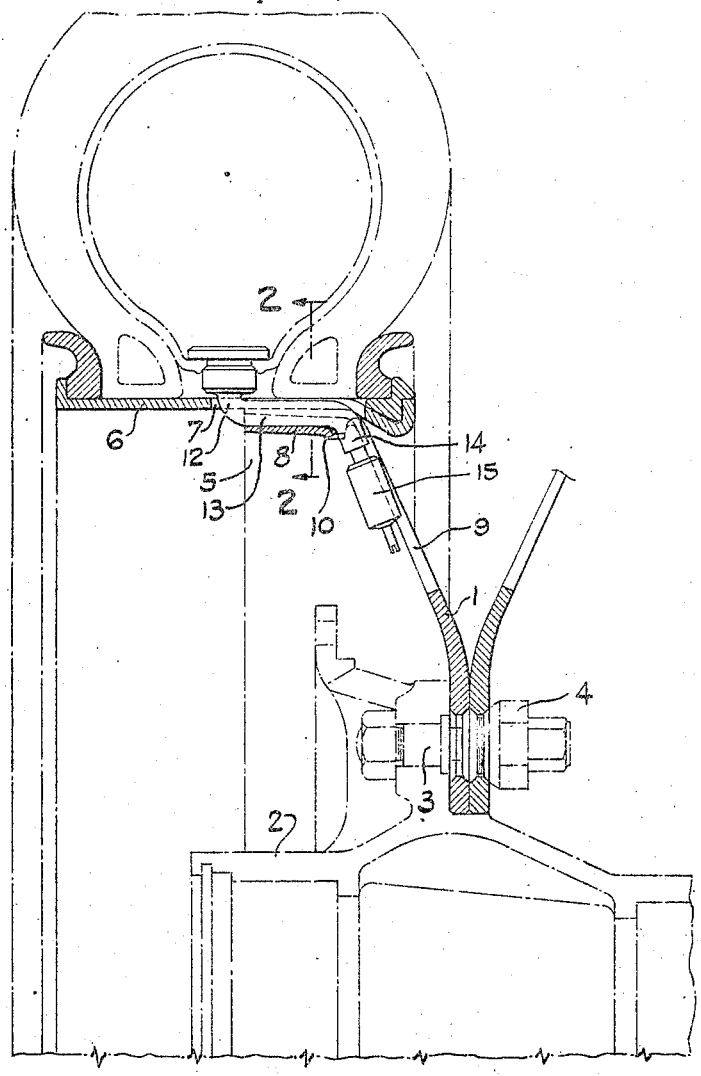
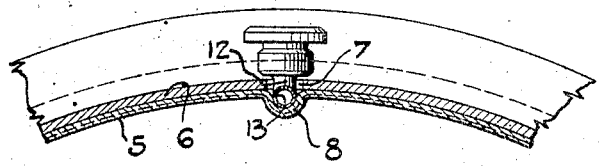

J. HAROLD HUNT, OF DETROIT, MICHIGAN, ASSIGNOR TO BUDD WHEEL COMPANY, OF PHILADELPHIA, PENNSYLVANIA, A CORPORATION OF PENNSYLVANIA.

VALVE-STEM ARRANGEMENT FOR VEHICLE WHEELS.

Application filed September 14, 1926. Serial No. 135,311.

This invention relates to vehicle wheels and has particular reference to that portion of a disc wheel structure wherein the tire valve stem emerges.

The primary object of the present invention is to provide a particularly simple and effective arrangement for bringing the valve stem through the tire rim and disc flange so that the tire may be easily and quickly mounted or demounted without danger of injury to the tire valve stem.

A further object is to provide an arrangement of the above character which shall include a support for the valve stem that will serve to retain the same in proper position and prevent relative movement between the valve stem and wheel elements.

A still further object is to provide a construction of this general character which may be easily formed without danger of deformation of the tire rim and associated parts.

These and other objects will become apparent as the description proceeds.

In the drawing accompanying and forming part of this application:

Fig. 1 is a fragmentary vertical sectional view through a wheel constructed in accordance with my invention and:

Fig. 2 is a fragmentary sectional view taken on the line 2—2 of Fig. 1.

In constructing a wheel in accordance with my invention, I provide a disc 1 which may be secured in any suitable manner to a hub indicated at 2, as by means of studs 3 and nuts 4. The outer peripheral edge portion of the disc is flanged over as at 5 to form a seat for a tire rim 6 which may be fastened thereto in any approved manner, not shown.

In order to accommodate the valve stem of a tire mounted on the rim 6, I perforate the rim to define a transverse elongated aperture 7 which extends from a point substantially midway of the rim to a point adjacent to but spaced from an edge thereof. The width of this aperture may be slightly greater than the diameter of the valve stem to be inserted therethrough, as clearly shown in Fig. 2. The disc flange directly beneath the aperture 7 is embossed inwardly to define a transversely extending trough shaped seat 8 for the valve stem. This seat preferably extends from the outer edge of the disc flange to a valve stem aperture 9 formed in the body of the disc, and at this point, the seat is deflected over as at 10 to avoid sharp corners which might injure the valve stem. The valve stem as shown in Fig. 1 is formed with a vertical portion 12 that connects in the usual or any approved manner with the inner tube, a horizontal portion 13 that engages seat 8, and an inwardly extending portion 14 that receives a suitable cap 15.

The tire is mounted on the rim by first inserting the outer end of the valve stem through slot 7 and into aperture 9, whereupon the valve stem will seat in the trough 8 as the tire is mounted on the rim in the usual manner.

By perforating the rim as described above, the edge thereof remains unbroken and this greatly adds to the strength thereof. Furthermore, the transverse seat 8 is formed in the disc flange only, instead of both the rim and disc flange, and hence the danger of deformation of the wheel during this embossing operation is reduced to a minimum.

What I desire to claim as new and useful by Letters Patent is:—

1. A wheel comprising a disc flanged at its peripheral portion to define a seat, a rim supported by said seat, said rim having a valve stem aperture extending radially therethrough, and a valve stem seat formed in the flanged portion of said disc beneath said aperture.

2. A wheel comprising a disc flanged at its peripheral portion to define a seat, a transversely disposed depression formed in said seat adapted to receive a valve stem, and a tire rim supported by said seat and having an aperture lying wholly within said rim and disposed over said depression.

3. A wheel comprising a disc flanged at its peripheral portion to define a seat and having a valve stem aperture adjacent said seat, said seat being embossed inwardly to define a valve stem receiving depression that intersects said valve stem aperture, and a tire rim supported by said seat and having an aperture disposed over said depression.

4. A wheel comprising a disc flanged at its peripheral portion to define a seat and having a valve stem aperture adjacent said seat, said seat being embossed inwardly along a line at right angles to the edge of said seat to define a valve stem receiving depression that intersects said valve stem aperture, the edge of said depression adjacent said aperture being rounded, and a rim supported by said seat and having an opening exposing said valve stem depression.

In testimony whereof I hereunto affix my signature.

J. HAROLD HUNT.